(12) United States Patent
Findley

(10) Patent No.: US 8,955,713 B2
(45) Date of Patent: Feb. 17, 2015

(54) AUTOMATED MAGAZINE FEEDER

(75) Inventor: Ronald Edward Findley, Fort Worth, TX (US)

(73) Assignee: Illinois Tool Works Inc., Glenview, IL (US)

( * ) Notice: Subject to any disclaimer, the term of this patent is extended or adjusted under 35 U.S.C. 154(b) by 1634 days.

(21) Appl. No.: 12/146,765

(22) Filed: Jun. 26, 2008

(65) Prior Publication Data

US 2009/0321464 A1 Dec. 31, 2009

(51) Int. Cl.
*B65H 3/44* (2006.01)
*G07F 11/00* (2006.01)

(52) U.S. Cl.
USPC ........... 221/123; 221/129; 221/119; 221/298; 221/1

(58) Field of Classification Search
CPC ................................. B65H 3/44; G07F 11/00
USPC .................... 221/119, 298, 129.1, 129, 1, 123
See application file for complete search history.

(56) References Cited

U.S. PATENT DOCUMENTS

| | | | | |
|---|---|---|---|---|
| 2,620,061 | A | | 12/1952 | Uxa |
| 2,771,215 | A | * | 11/1956 | Opgenorth et al. ............ 221/251 |
| 2,965,262 | A | * | 12/1960 | Du Bois ........................ 221/115 |
| 3,837,528 | A | * | 9/1974 | Rakucewicz .................. 221/114 |
| 4,057,171 | A | * | 11/1977 | Hatori et al. ...................... 221/6 |
| 4,126,217 | A | * | 11/1978 | Bock ............................. 194/291 |
| 4,324,520 | A | | 4/1982 | Kjellberg |
| 4,386,641 | A | | 6/1983 | Horn |
| 4,405,059 | A | * | 9/1983 | Kull .............................. 221/129 |
| 4,417,680 | A | | 11/1983 | Culley, Jr. |
| 4,841,327 | A | * | 6/1989 | Yamamoto et al. ........... 396/257 |
| 4,941,327 | A | * | 7/1990 | Miles .............................. 62/246 |
| 4,978,032 | A | * | 12/1990 | Newman et al. .............. 221/119 |
| 5,065,905 | A | * | 11/1991 | Eddy et al. .................... 222/132 |
| 5,306,115 | A | | 4/1994 | Montalvo et al. |
| 6,162,009 | A | * | 12/2000 | Kvalheim .................. 414/798.1 |
| 6,379,105 | B1 | | 4/2002 | Aylsworth |
| 6,655,902 | B2 | | 12/2003 | Dubéet et al. |
| 6,923,614 | B2 | * | 8/2005 | Aylsworth .................. 414/797.4 |
| 7,011,006 | B2 | | 3/2006 | Koskovich |
| 2007/0212208 | A1 | * | 9/2007 | Hansl et al. ................ 414/788.7 |

* cited by examiner

*Primary Examiner* — Rakesh Kumar
(74) *Attorney, Agent, or Firm* — Alston & Bird LLP

(57) ABSTRACT

An automated magazine feeder device is provided for supplying a manufacturing operation with elongate members of varying sizes in an assembly order dictated sequence. An apparatus for dispensing elongate members may include a magazine and a rotatable support member. The magazine may contain a plurality of elongate members including an elongate member in a first location and an elongate member in a second location immediately adjacent the elongate member in the first location. The first rotatable support member may include a first arm and a second arm. The first arm of the first rotatable support member supports the elongate member in the first location when the first rotatable support member is in a first position. The elongate member in the first location is ejected from the magazine by the second arm of the first rotatable support member in response to the first rotatable support member being rotated from the first position to a second position. The second arm of the first rotatable support member supports the elongate member in the second location in response to the first rotatable support member being rotated to the second position.

20 Claims, 9 Drawing Sheets

AUTOMATED MAGAZINE FEEDER

TECHNOLOGICAL FIELD

The present invention relates to an apparatus and method for dispensing articles of varying sizes in an automated fashion. More particularly, the present invention relates to dispensing elongate members of varying sizes in a manner that permits ejection of one member while supporting the remaining members.

BACKGROUND

Automated manufacturing methods for producing goods from a variety of materials are becoming more prevalent through the use of computer controlled saws, machines, and assembly robots. To optimize efficiency, appropriately sized materials need to be provided to these machines quickly and efficiently. Existing material feeders and hoppers provide one solution for supplying automated machinery with the raw materials necessary to complete their operations. Automated material feeders and hoppers allow operators to supply the hoppers with batches of materials that do not need to correspond to the order of parts required on an assembly line. However these existing material feeders have drawbacks that prevent the maximum efficiency of the automated machinery from being achieved.

The construction industry is making strides in automation driven by the need to lower production costs. In an age where cookie-cutter houses are no longer desirable and custom-built homes are the norm, automation is becoming increasingly complex. Building components that are fabricated off-site are tending more towards custom orders that cannot be fabricated in large batch builds as they have been in the past. Therefore a system of automation that can adapt to frequently changing designs is necessary to reduce manufacturing costs.

Automated feeders for elongated articles are a desirable tool for such manufacturing facilities as roof-truss manufacturers. With increasing automation involved in the manufacture of roof-trusses and the increasingly complex and unique roof-trusses that are being fabricated, an automated magazine feeder handling, for example, lumber comprising the truss members, would be of particular use in this field. The complexities of the roof-trusses require a variety of different sizes of components and these components need to be supplied in proper quantities and in an optimum sequence to maximize efficiency. A machine that can deliver individual components of the proper size to a roof-truss manufacturing line in an optimal sequence, with the efficiency of batch restocking of the line can vastly improve present manufacturing efficiencies.

Existing board-feeding magazines are generally large, complex machines for the limited capacity and small variety of materials they can provide. They can be overly complicated and difficult to troubleshoot and maintain. There exists a need for an automated magazine feeder that can provide the necessary material variety, the capacity to maximize efficiency, and ability to sequentially deliver individual components to a manufacturing line quickly, efficiently, and reliably.

BRIEF SUMMARY

Embodiments of the present invention generally relate to an apparatus and method for dispensing elongate members from a stacked magazine. An automated magazine feeder of an exemplary embodiment of the present invention can sequentially dispense material individually to a manufacturing line. In an exemplary embodiment, multiple automated magazine feeders may be used in tandem to dispense elongate materials of different sizes with various profiles and lengths where each magazine contains only a single size and profile of material. The automated magazine feeders of embodiments of the present invention are typically aligned with the long dimension of the elongate member generally parallel to the direction of flow of the production line for conveying an elongate member into a machine operation, such as an automated saw.

The automated magazine feeder of an exemplary embodiment may aid efficiency by allowing the supply of elongate members to be replenished in batches while feeding the manufacturing line with individually requested components.

The automated magazine feeder of an exemplary embodiment may be comprised of a stacking magazine that may be configured to hold a stack of elongate members with a broad dimension of a profile of the elongate members in the horizontal plane. The capacity of the magazine feeder may be determined by the height of the stacking magazine and the thickness of the elongate members. The capacity of any particular size of material may be increased by adding multiple magazine feeders for the same size material if a maximum feasible magazine height does not provide sufficient capacity. The elongate members are generally retained in the stacking magazine via support members at each corner which also serve to align the stack of elongate members. The automated magazine feeder of an exemplary embodiment may further comprise a motor or actuator connected to a rotatable support member. The motor or actuator may rotate a rotatable support member to dispense a single elongate member when rotated through a single cycle, while supporting the remaining members.

In one embodiment, the automated magazine feeder may have a rotatable support member at either end of the bottom elongate member in the stacking magazine. To dispense the bottom elongate member, the rotatable support member may be rotated through a turn of about 45 to 90 degrees by the motor or actuator. During this rotation a first arm of the rotatable support member is rotated out from under the bottom elongate member. A second arm of the rotatable support member is configured to push or urge the bottom elongate member off of the first arm while the rotatable support member is rotated from an initial position to a second position. The second arm, whose top surface is on a higher plane than the top surface of the first arm, may simultaneously advance under the elongate member immediately above the bottom member to support the magazine stack as the bottom member is ejected.

Once the rotatable support member completes the rotation described above as a first action, the bottom elongate member is ejected from the bottom of the magazine stack, for example, onto a conveyor below. The second arm of the rotatable support member may then hold the magazine stack in place. The rotatable support member may be rotated back to the initial position after ejecting the bottom elongate member. In response to the rotatable support member being rotated back to the initial position, the first arm of the rotatable support member may be rotated back to a position beneath the magazine stack and the second arm may be rotated out from under the magazine stack. Substantially vertical members of the automated magazine feeder may hold the remaining elongate members in place laterally as the second arm is slid out from under the stack via rotation, whereupon the stack may descend from atop the second arm to atop the first arm attaining the same configuration as prior to the ejection cycle.

Another exemplary embodiment of the present invention comprises a rotatable support member that is configured to enable raising and lowering as part of preparing to begin the ejection process or entering a rest position after the ejection process. In this regard, before the rotatable support member begins to rotate and eject the bottom elongate member, it may be lowered at least the thickness of an elongate member to allow ejection of the member without interference. In this embodiment, the stack of elongate members is lowered along with the rotatable support member. After the rotatable support member cycles through the ejection operation back to the initial position, the rotatable support member may be raised back up to the original level if no further ejections are immediately planned or if it is desirable to maintain the magazine in a stowed condition. The configuration of this embodiment permits adjacent magazine feeders to be arranged at the same, or more similar heights from the conveyor than would be possible without a rotatable support member that can be raised and lowered.

An example of the utility of an embodiment of this invention would be in a truss-manufacturing facility where the manufacturing line may include a computer logistics system, an automated magazine feeder, an automated miter-type saw station, an assembly jig station and a conveyor that transfers material between the manufacturing stations. A very basic truss design may include six elongate members of three basic lengths and one basic profile. An automated magazine feeder system to accommodate this design may have three separate automated magazine feeders arranged adjacent to one another to accommodate the members of three different lengths. The computer system may specify an optimum assembly order that requires the delivery of the six elongate members to a machine such as a saw or assembly jig in a particular sequence. The computer may send a first signal to the appropriate automated magazine feeder that contains the proper size elongate member for the first component. The automated magazine feeder may cycle through the ejection operation moving the first component to the conveyor. The conveyor may move the first component to the automated saw where the appropriate cuts may be made corresponding to the first component in the truss design. After the conveyor beneath the automated magazine feeder is clear, the computer may send a second signal to the automated magazine feeder that contains the elongate member of the second component. The automated magazine feeder may cycle through the ejection operation moving the second component to the conveyor. After the first component has been properly cut and is clear of the saw, the second component may move into the automated saw station. While all of the components in this example could be cut from a single size elongate member equivalent to the size required for the longest component, the automated magazine feeder can supply the minimum sizes needed for each component in sequence reducing waste and cutting production costs. Further, a single elongate member may be cut by the automated saw station into multiple components to minimize waste and improve efficiency. This example also illustrates how a material stocker for the manufacturing line can deliver batches of each of the three different sizes of elongate materials without regard to the sequence required in the operation, provided the automated magazine feeders are maintained at a minimum stock level.

The automated magazine feeders may also include a funneling hopper configured to feed the automated magazine feeders. A funneling hopper may allow a material stocker to place a large volume of elongate members in the hopper without requiring precise alignment of the members which would expedite the material stocking process. A funneling hopper may taper to a narrower opening at the entrance to the automated magazine feeder and the hopper may be configured to align the elongate members with the opening of the automated magazine feeder. The funneling hopper may allow the material stocker to more quickly replenish the automated magazine feeders and increase overall efficiency of the manufacturing process.

BRIEF DESCRIPTION OF THE SEVERAL VIEWS OF THE DRAWINGS

Figure 1:
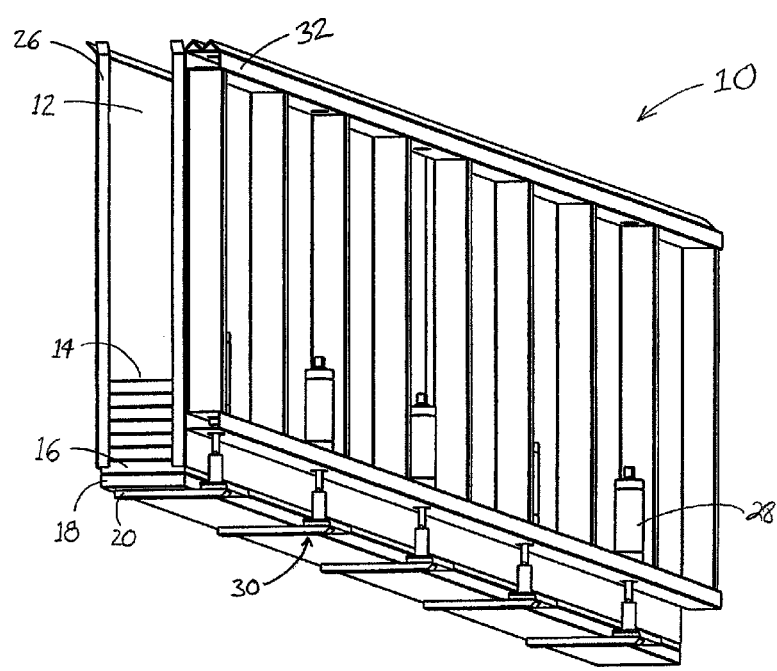
Figure 2:
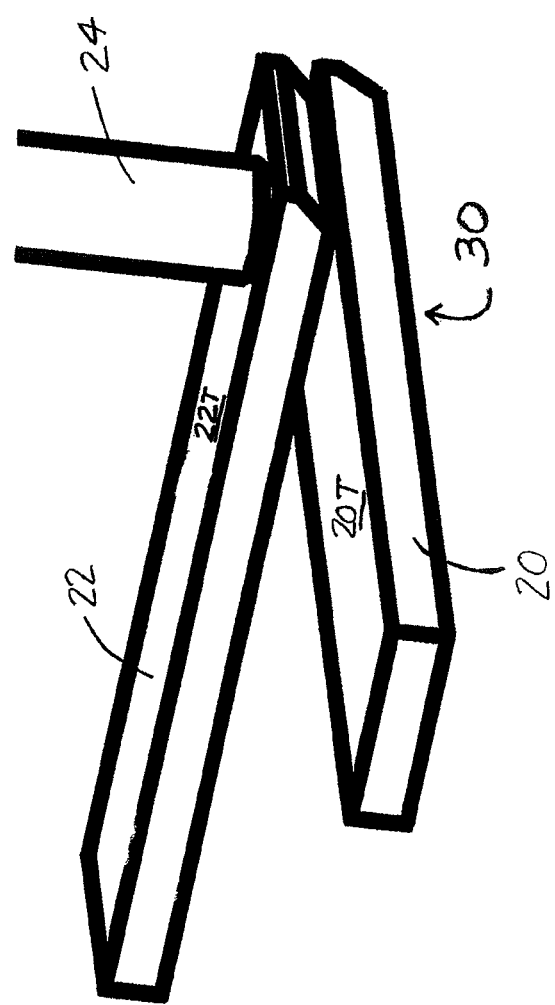
Figure 3:
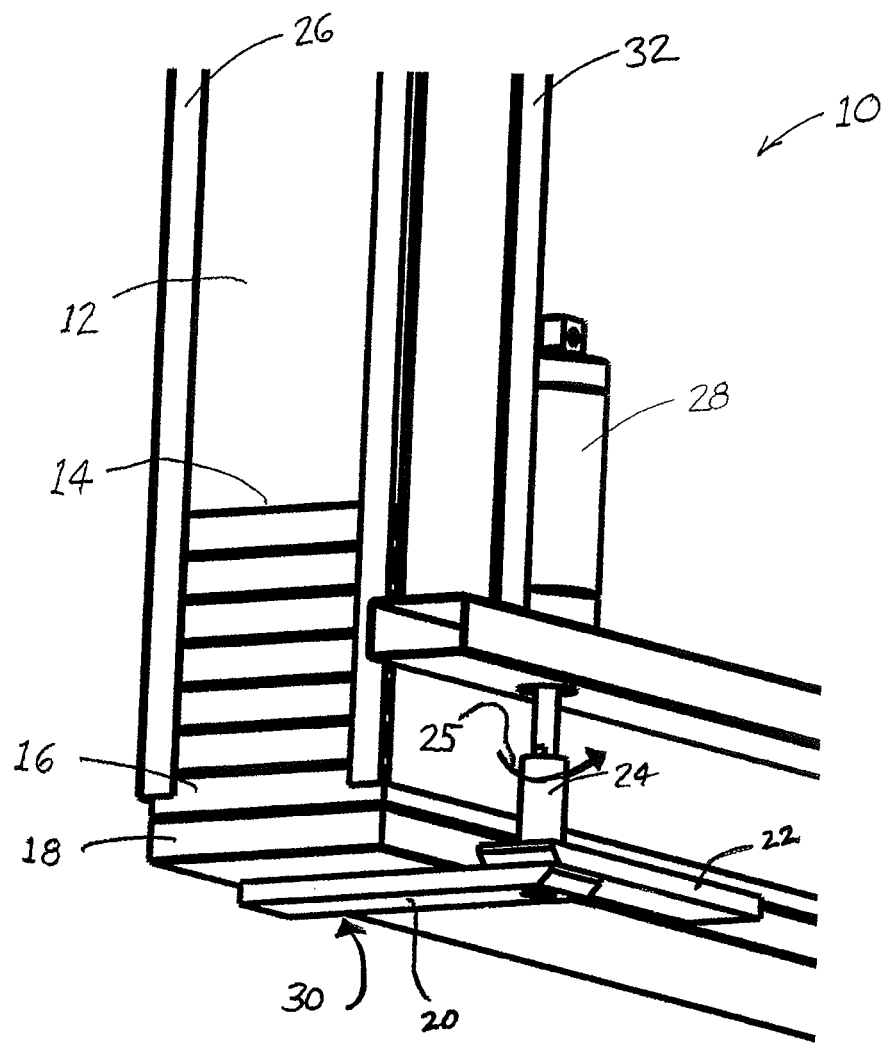
Figure 4:
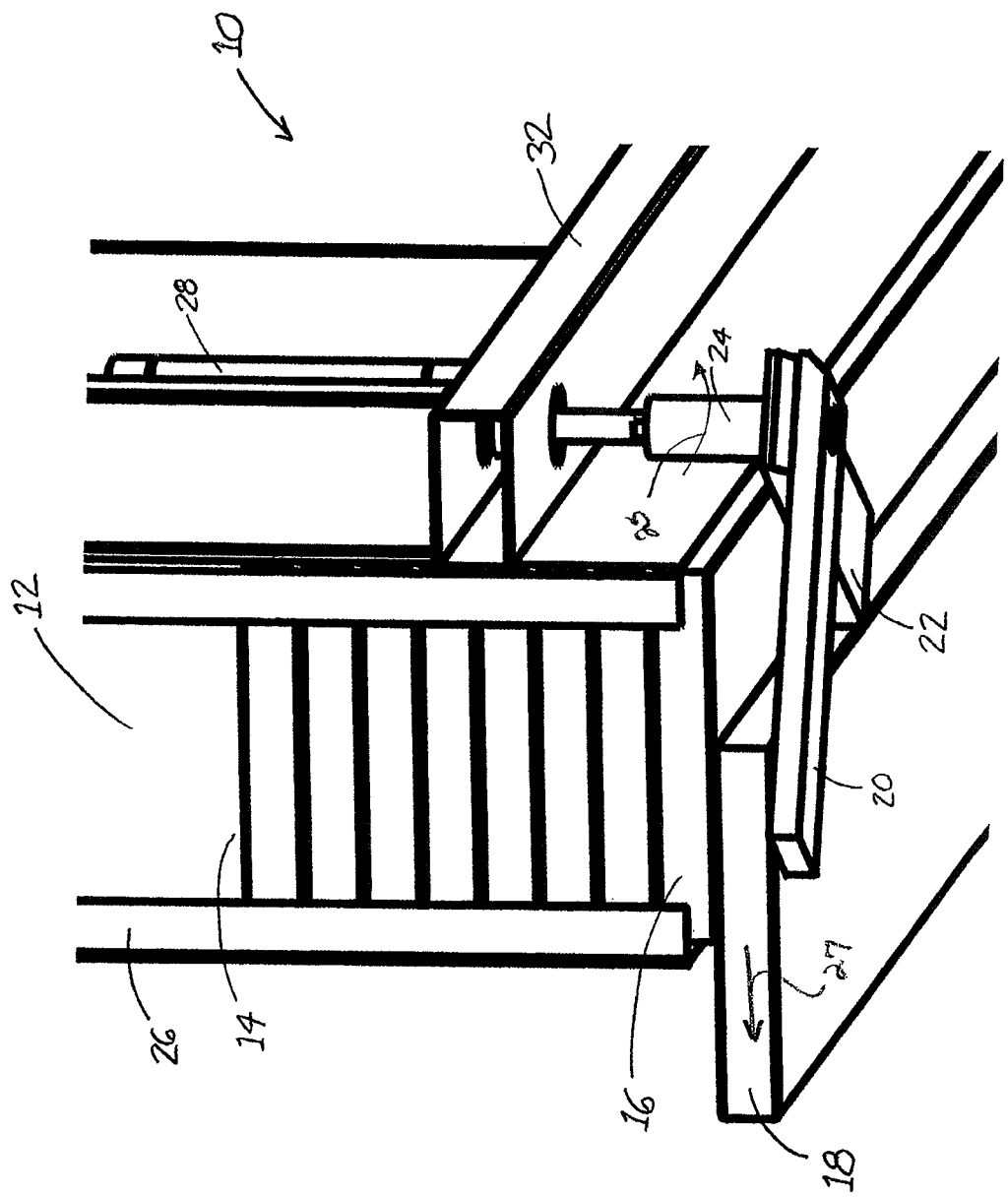
Figure 5:
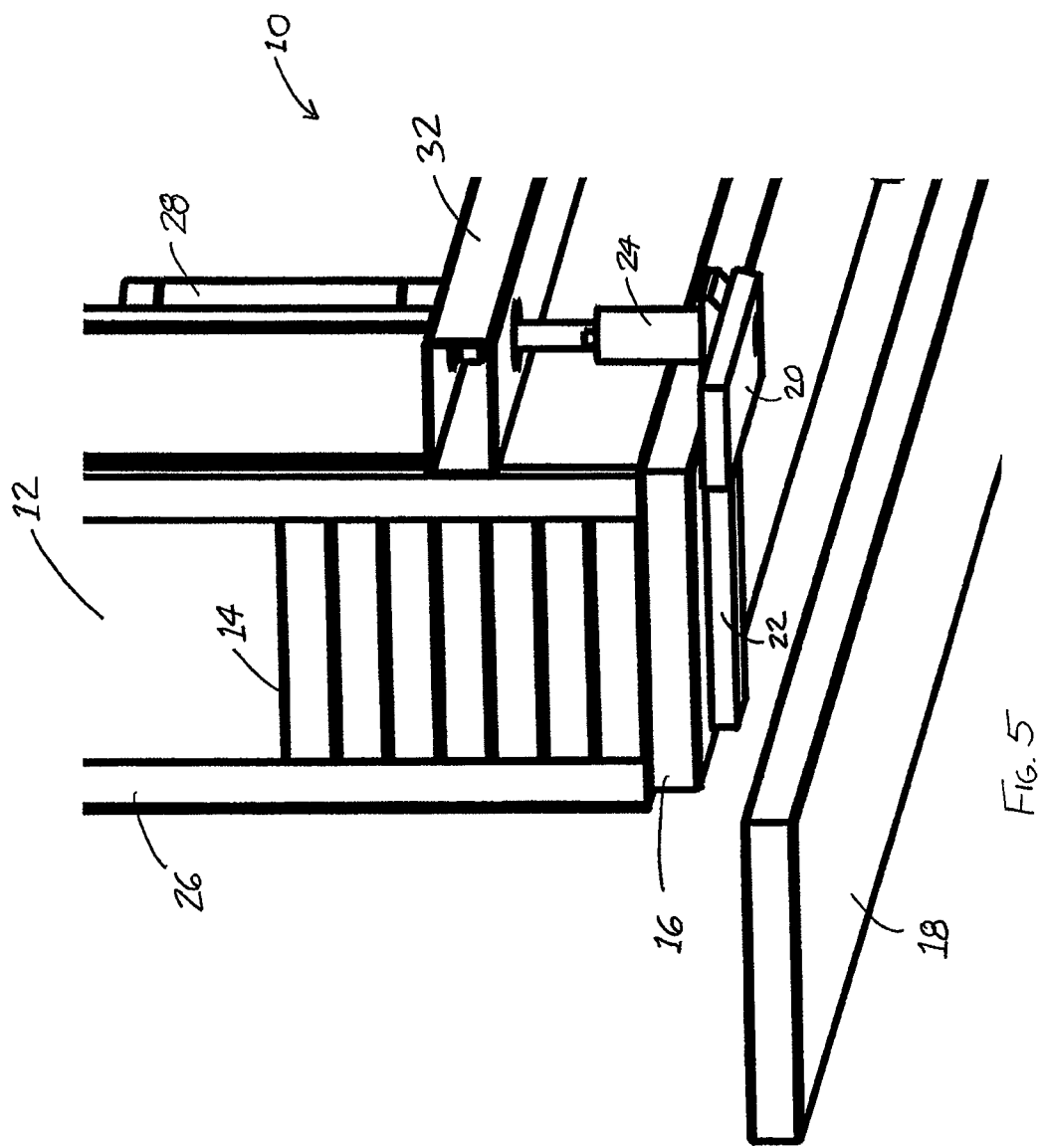
Figure 6:
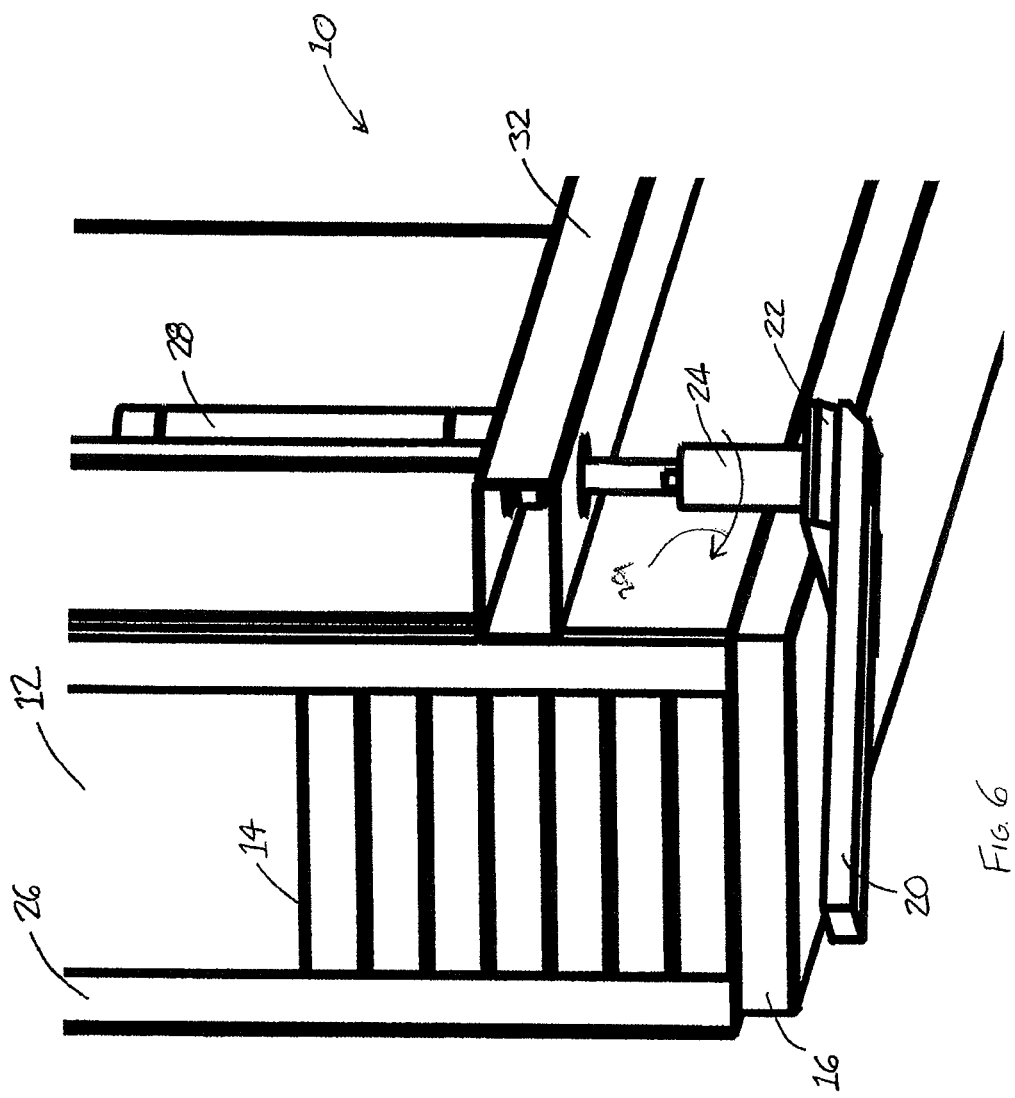
Figure 7:
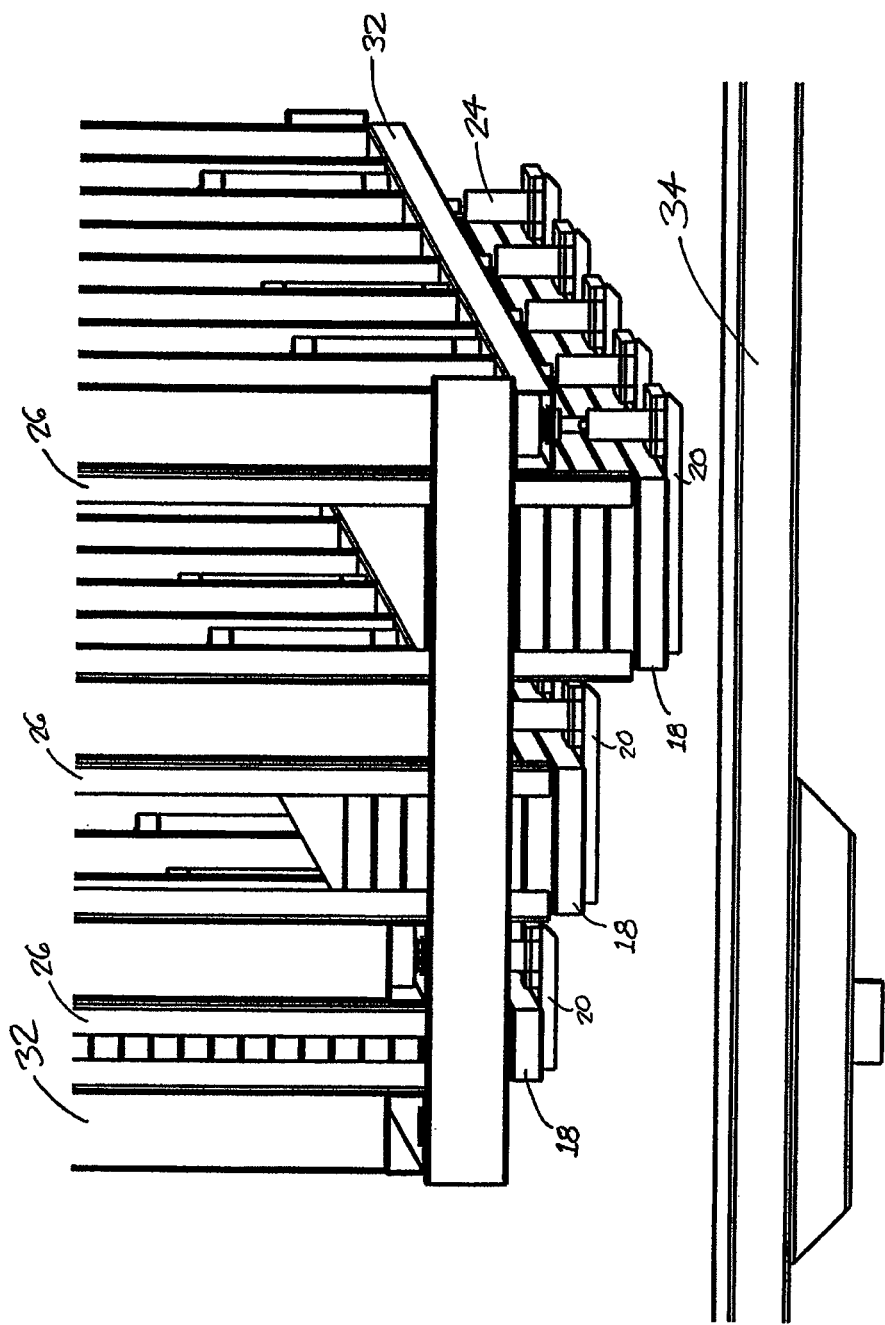
Figure 8:
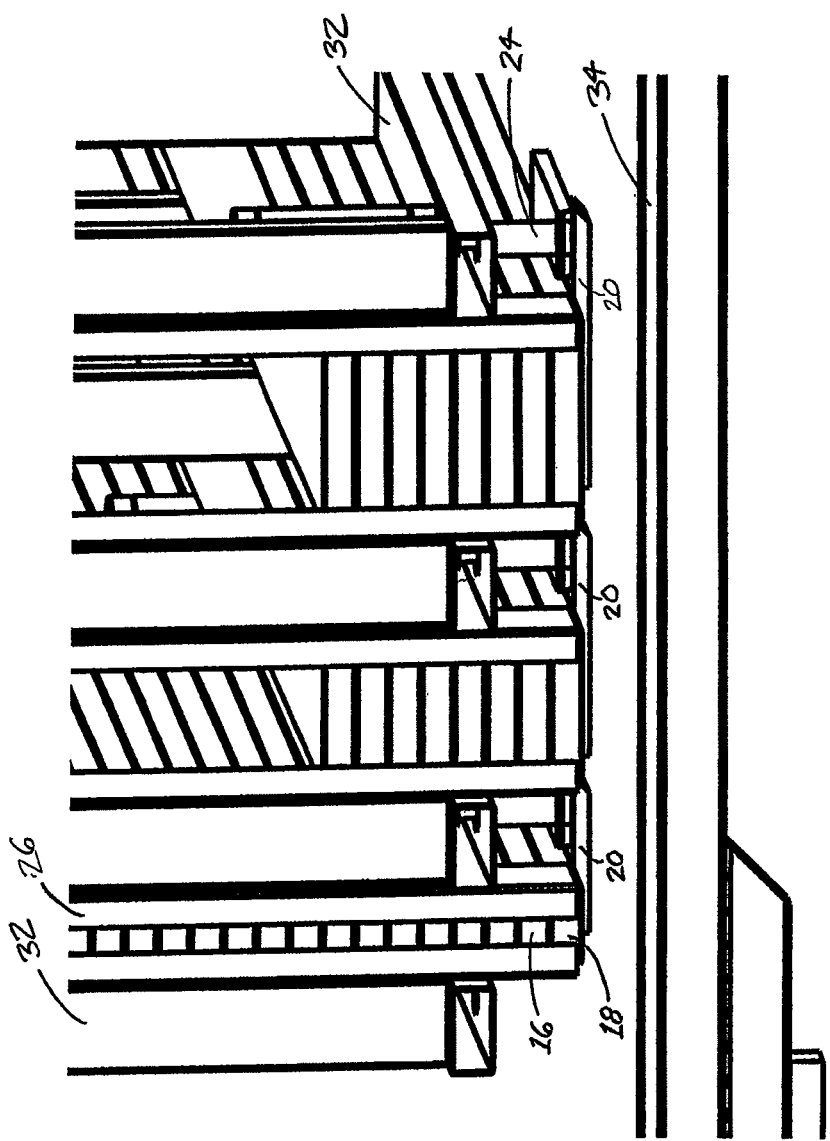
Figure 9:
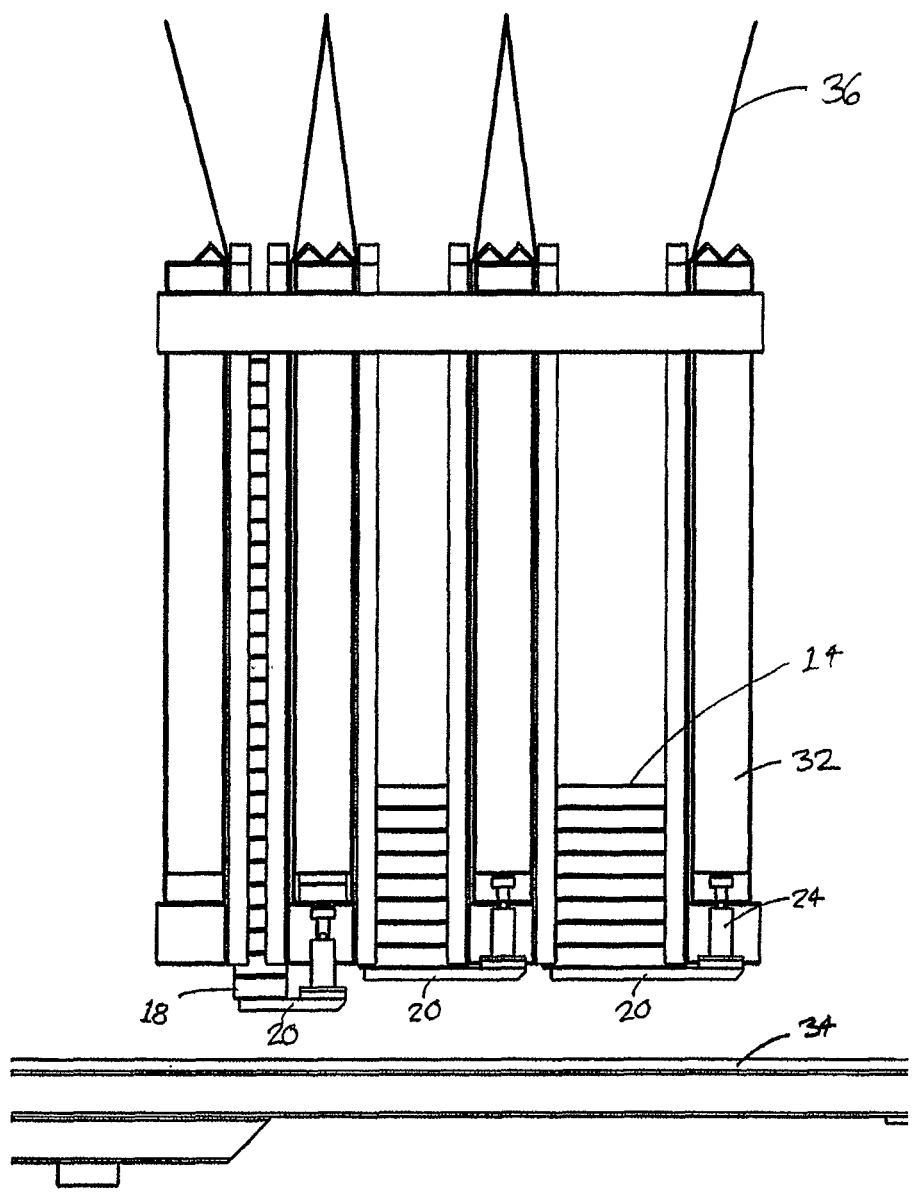

Having thus described the invention in general terms, reference will now be made to the accompanying drawings, which are not necessarily drawn to scale, and wherein:

FIG. 1 is a perspective view of one end of an automated magazine feeder according to an exemplary embodiment;

FIG. 2 is a perspective view of the rotatable support member according to an exemplary embodiment;

FIG. 3 is a perspective view of the automated magazine feeder with the rotatable support member in the initial position according to an exemplary embodiment;

FIG. 4 is a perspective view of the automated magazine feeder with the rotatable support member at the beginning of the ejection operation according to an exemplary embodiment;

FIG. 5 is a perspective view of the automated magazine feeder with the bottom elongate member fully ejected according to an exemplary embodiment;

FIG. 6 is a perspective view of the automated magazine feeder with the rotatable support member returning to the initial position according to an exemplary embodiment;

FIG. 7 is an illustration of multiple staggered automated magazine feeders according to one embodiment;

FIG. 8 is an automated magazine feeder according to another embodiment with a drop-down rotational support device; and FIG. 9 is an exemplary embodiment of the funneling hoppers as configured on the assembly of FIG. 7.

DETAILED DESCRIPTION OF THE DRAWINGS

Exemplary embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention generally relate to an automated magazine feeder for dispensing elongate material automatically. An elongate member may be a component of any type of generally rigid material that is substantially longer in one dimension than in the two dimensions of the profile. An example of an elongate member may be a standard lumber 2-by-4 of virtually any length, preferably longer than 12 inches. Other types of elongate members may include aluminum channel, copper pipe, PVC pipe, or electrical conduit among many other materials. For ease of explanation, however, the specification and accompanying figures will refer to an automated magazine feeder for dispensing elongate pieces of standard-sized lumber such as 2-by-4s, 2-by-6s, 2-by-8s, etc. It is appreciated that other embodiments of this invention may be used for dispensing other materials and other sizes for this and for other applications, such as composite or metal materials among others.

As described further below according to an exemplary embodiment, the automated magazine feeder includes a magazine that contains a stack of similarly sized elongate members configured to lie on a broad dimension of their profile, a rotatable support member that supports the stack, and an actuator or motor to rotate the rotatable support member. In some embodiments, a computer controlled program may be used to determine when an elongate member of a particular size is required. The computer may send a signal to the motor or actuator to rotate the rotatable support member which ejects a single elongate member from the magazine while simultaneously supporting the stack of elongate members immediately above the one being ejected. The ejected elongate member may fall to a conveying mechanism below the magazine for transport to the manufacturing operation. While the pictured embodiment illustrates the elongate members being stacked on the broad dimension of their profile, it should be noted that the magazine may be configured to stack the elongate members on the narrow dimension of their profile. Each magazine feeder may accommodate a variety of lengths of materials by incorporating an adjustable stop at one or both ends of the magazine feeder so that the elongate member may maintain alignment within the magazine feeder. The rotatable support members may also be adjustable in their positions along the length of the elongate member to accommodate a different length of elongate member.

The automated magazine feeder may be attached and/or adjacent to additional automated magazine feeders configured to hold different sizes of elongate members of differing lengths and/or differing profiles. Multiple automated magazine feeders for the same size elongate member may be present, particularly for more frequently used sizes. In this configuration, the automated magazine feeders are sent signals from a computer program that indicate which automated magazine feeder is required to eject the next elongate member in the assembly process. The requested elongate member may then be ejected from the appropriate automated magazine feeder and conveyed to the next work station for the next operation to be completed. The proper sequential feeding of the elongate members may serve to improve the efficiency of the manufacturing system.

A funneling hopper 36 may be configured to align and feed elongate members into the automated magazine feeder. The hopper 36 will improve the efficiency of the magazine loading function by making it easier for the stocking operator to align the elongate members within the proper magazine feeder 10.

Referring to FIG. 1, an automated magazine feeder 10 is illustrated according to one embodiment. In the pictured embodiment, a stacking magazine 12 may be configured to hold a plurality of elongate members 14 that may be stacked along a broad dimension of their profile. The elongate members 14 may be aligned and held in place laterally by at least substantially vertical supports 26 that are generally located at the four corners of the elongate members 14. A support frame 32 may be configured to support the stacking magazine 12 above a conveyor 34 (See FIG. 7) on the manufacturing line. A motor or actuator 28 may be connected to the support frame 32. A rotatable support member 30 may be connected to the motor or actuator 28 via a rotating member 24 and the rotatable support member 30 may comprise two arms 20, 22. The first arm 20 supports the bottom elongate member 18 in a first location when the rotatable support member 30 is in an initial, un-rotated position. When in this initial position, the second arm 22 of the rotatable support member 30 may be positioned adjacent to the bottom elongate member 18. In an exemplary embodiment, the first arm 20 may be positioned substantially perpendicular to a direction of extension of the bottom elongate member 18 along the longest dimension of the bottom elongate member 18 while in the initial position. Meanwhile, the second arm 22 may be positioned substantially parallel to the longest dimension of the bottom elongate member 18 in the initial position. The top surface of the second arm 22 may be positioned above the top surface of the first arm 20, but below the bottom surface of the elongate member in the second location 16, immediately above the bottom elongate member 18. The substantially vertical supports 26 of the long side of the magazine opposite the rotatable support member 30 may be shorter than the substantially vertical supports adjacent the rotatable support member 30. The bottom of the substantially vertical supports 16 opposite the rotatable support member 30 may be spaced at least the thickness of one elongate member above the top surface of the first arm 20, but less than the thickness of two elongate members. The first and second arms 20, 22 of the rotatable support member 30 are each of sufficient strength to support the full capacity of the stacking magazine 12.

Referring to FIG. 2, the rotatable support member 30 is illustrated in a perspective view. The top surface 20T of the first arm 20 is shown below the top surface 22T of the second arm 22. In an exemplary embodiment, the bottom surface of the second arm 22 may rest on the top surface of the first arm 20, as shown proximate rotating member 24. The illustrated embodiment shows the first and second arms 20, 22 at a right angle with respect to each other, though it should be appreciated that a variety of angles will function equally as well, generally less than 90 degrees. The rotating member 24 extends from a motor or actuator 28 to rotate the rotatable support member 30. The arms 20, 22 may be held in fixed positions relative to the rotating member 24 such that they rotate at the same angle as the rotating member 24 during the ejection operation. The second arm 22, when rotated, may serve to push or eject only one elongate member 14 from the vertical stack and therefore the top surface of the second arm 22 does not rise above the top of the bottom elongate member 18. The material used for the first and second arms 20, 22 is a generally rigid material that may be a hollow channel, a solid piece, or a stamping among other configurations that are sufficient to support the weight of the stack of elongate members 14. The first and second arms 20, 22 of the rotational support device 30 may also be coated with a low-friction material such as Teflon® or nylon among other materials, to reduce the power required to rotate the rotational support device 30. The arms 20, 22 of the rotatable support device 30 may be configured to accommodate a particular size of elongate member, for example a rotatable support device 30 for a thicker elongate member will likely have the top surface of the second arm 22 at a greater step above the top surface of the first arm 20.

Referring to FIGS. 3 through 6, the operation sequence of the automated magazine feeder 10 is shown. FIG. 3 illustrates the rotatable support member 30 in the initial position where it supports the entire magazine stack 12 on the first arm 20. When a request signal is sent by the computer program to the motor or actuator 28 of the automated magazine feeder 10, the motor or actuator 28 may begin the ejection operation by rotating the rotatable support member 30. Based on the configuration of the illustrated embodiment, the rotation would be in the counter-clockwise direction (as viewed from above and as shown by the arrow 25), but it should be appreciated that an optional configuration could use clockwise-rotation. When multiple rotatable support members 30 are used, they do not necessarily need to use the same rotational direction. A single motor or actuator 28 may be used to turn multiple rotatable support members 30 through gears, belts, levers or similar mechanical means. The motor or actuator 28 may be hydraulically, pneumatically, or electrically operated or may be any type of device capable of rotating the rotatable support member 30. Additionally, while the embodiment illustrated indicates a computer controlled activation of the motor or actuator 28, it should appreciated that an alternative to the computer controlled activation is a manual push-button or switch style operation with an operator functioning in the roll of the computer. This alternative would be suitable for a lower-cost magazine feeder or in combination with the computer actuation for a manual override of the computer function. A further option to operate the rotatable support member(s) 30 may include a manual lever, handle, or wheel attached such that an operator can manually operate the ejection mechanism without the aid of a power-driven device. This manual operation may be used in conjunction with the automated solution to provide a manual bypass should any portion of the automated operation fail or not completely eject an elongate member.

As shown in FIG. 4, when the rotatable support member 30 begins to rotate, the first arm 20 begins to rotate out from under the bottom elongate member 18. Simultaneously, the second arm 22 of the rotatable support member 30 may function to push or urge the bottom elongate member 18 in the direction away from the rotating member 24 of the rotatable support member 30. As the second arm 22 begins to urge the bottom elongate member 18 in the direction of arrow 27 from under the member immediately above the bottom elongate member 18 (in the second location 16), the second arm 22 begins to support the elongate member in the second location 16. If the first and second arms 20, 22 are of equal length and at 90 degrees relative to each other, the bottom elongate member 18 may become fully ejected when the rotatable support member has reached an angle of 45 degrees from the initial position. One of ordinary skill in the art should appreciate that the angle of full ejection changes with the relative length and relative angle between the first and second arms 20, 22. Differing configurations of the rotatable support member 30 may be appropriate for different types and sizes of materials. Once the bottom elongate member 18 is fully ejected from the magazine stack 12, the magazine stack 12 may be fully supported by the second arm 22 of the rotatable support member 30. The elongate member in the second location 16 is now the lowest in the magazine stack 12. To complete the ejection operation and prepare the ejection mechanism for the next request signal, the rotatable support member 30 may be rotated clockwise in the direction of arrow 29 back from the ejection or second position toward the initial position as illustrated in FIG. 6. As the rotatable support member 30 is rotated back to the initial position, the second arm 22 may rotate from beneath the elongate member in the second location 16 which is held in place laterally by the substantially vertical members 26. As the initial position is reached, the elongate member in the second location 16 drops from the second location to the first location and becomes the bottom elongate member 18 ready for the next ejection cycle.

It should be appreciated that a single rotatable support member 30 may be capable of performing the above-described operation if appropriately sized and located for the automated magazine feeder 10, but any number of rotatable support members 30 may be used to accomplish the same task. For example, typically an elongate member with a 16-foot length will require more rotatable support members 30 than an elongate member of a 6-foot length.

Referring to FIG. 7, a series of automated magazine feeders 10 are illustrated according to one embodiment. Multiple magazine feeders may be used to dispense a variety of sizes of elongate members 14 or they may serve to increase capacity of a single size of elongate member 14. The support frame 32 of the embodiment of FIG. 7 supports the series of automated magazine feeders 10 of various sizes adjacent to each other along the long dimension of the elongate member 14, and above conveyor 34. The series of automated magazine feeders 10 are arranged in a vertically staggered configuration to accommodate the ejection mechanism as described above. The stagger placement of the adjacent stacks may be offset by at least the thickness of a single elongate member to allow ejection without interference.

FIG. 8 illustrates an alternative embodiment of the automated magazine feeder 10. The rotatable support member 30 of FIG. 8 is illustrated in a retracted position. When the signal is sent to the automated magazine feeder 10 via computer to the actuator 28, the rotatable support member 30 may be lowered by a height of about the thickness of one elongate member 14. In this regard, for example, the rotatable support member 30 may be vertically moveable in a direction collinear with shaft of rotating member 24 and substantially perpendicular to the plane of rotation of the rotatable arms 20, 22 in order to conduct the lowering. The rotatable support member 30 may then rotate and go through the ejection operation as illustrated in FIGS. 3 through 6 before being retracted to the position shown in FIG. 8. This embodiment allows a plurality of automated magazine feeders 10 to be attached adjacent to each other without the need for staggering as illustrated in FIG. 7. The lowering and retracting of the rotatable support member 30 may prevent interference between the ejection operations of each of the automated magazine feeders. If the same sized material is required for sequential components, the rotatable support member 30 may go through multiple ejection cycles between the lowering and retracting steps thereby preventing unnecessary raising and lowering of the rotatable support member 30 and decreasing cycle time.

The exemplary embodiment of FIG. 8 may use a rotatable support member 30 that is lowered by a mechanical actuation, such as a hydraulic or pneumatic cylinder, or other lifting and lowering means. The lifting and lowering means may be configured to lower the rotatable support member(s) 30 or to lower an assembly that contains the rotatable support member(s) 30. The lifting and lowering means may also be configured to lower and lift the entire automated magazine feeder 10 to achieve a stagger or offset between adjacent automated magazine feeders 10 during the ejection operation. It should be appreciated that while an automated lifting and lowering mechanism is disclosed, an optional embodiment of the lifting and lowering mechanism may be manually activated by a push-button, switch, or the like and/or the operation may have a manual interface that allows an operator to lift and lower the rotatable support member 30 or the automated magazine feeder 10 by hand. The automatic and manual actuation may be used in conjunction to allow an operator to override the automatic operation.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for dispensing elongate members comprising:
   a first magazine for containing a plurality of elongate members including an elongate member in a first location and an elongate member in a second location immediately adjacent the elongate member in the first location; and
   a first rotatable support member attached to the first magazine comprising a first arm and a second arm;
   wherein the first arm of the first rotatable support member supports the elongate member in the first location when the first rotatable support member is in a first position;
   wherein the elongate member in the first location is pushed by the second arm of the first rotatable support member to urge the elongate member off of the first arm in order to eject the elongate member from the magazine in response to the first rotatable support member being rotated from the first position to a second position, and
   wherein the second arm of the first rotatable support member supports the elongate member in the second location in response to the first rotatable support member being rotated to the second position.

2. The apparatus of claim 1, wherein the first rotatable support is configured to support the stack of elongate members and selectively retain or release elongate members.

3. The apparatus of claim 1, wherein the elongate member in the second location moves to the first location in response to the first rotatable support member being rotated from the second position to the first position.

4. The apparatus of claim 1, further comprising a second magazine and a corresponding second rotatable support member configured for dispensing a second plurality of elongate members from the second magazine.

5. The apparatus of claim 4, wherein the elongate member in the first location of the first magazine is at a different elevation than the elongate member in the first location of the second magazine.

6. The apparatus of claim 1, wherein the first rotatable support member is movable from a first height to a second height relative to an end of the first magazine at which the elongate member in the first location is disposed before the first rotatable support member is rotated between the first position and the second position.

7. The apparatus of claim 6, wherein the difference between the first height and the second height is at least a thickness of an elongate member.

8. The apparatus of claim 6, wherein the first rotatable support member is movable from the second height to the first height after the rotatable support member is rotated between the second position and the first position.

9. The apparatus of claim 1, wherein a first surface of the second arm is disposed in a parallel plane with respect to a plane in which a first surface of the first arm lies, and wherein the first surface of the second arm is disposed to be in contact with a surface of the elongate member in the second location when the first rotatable support member is rotated to the second position.

10. The apparatus of claim 1, wherein the first arm and the second arm are configured to extend at an angle relative to each other and the arms have a common axis of rotation.

11. The apparatus of claim 10, wherein the angle is about 90 degrees.

12. The apparatus of claim 10, wherein the first arm and the second arm of the rotatable support device are displaced from one another with respect to the axis of rotation.

13. The apparatus of claim 1, wherein an ejection of the elongate member from the first location is controlled by a computer program, a switch or a manually operable lever.

14. The apparatus of claim 1, wherein the first arm is disposed to extend substantially perpendicular to a direction of extension of a longest dimension of the elongate member in the first location while the first rotatable support member is in the first position and the second arm is disposed to extend substantially parallel to the direction of extension of the longest dimension of the elongate member in the first location while the first rotatable support member is in the first position.

15. The apparatus of claim 1, wherein the first arm is disposed to extend substantially parallel to the direction of extension of the longest dimension of the elongate member in the second location while the first rotatable support member is in the second position and the second arm is disposed to extend substantially perpendicular to the direction of extension of the longest dimension of the elongate member in the second location while the first rotatable support member is in the second position.

16. The apparatus of claim 1, wherein a funneling hopper is configured above the first magazine.

17. A method for dispensing elongate members comprising:
   supplying a vertical stack of elongate members;
   supporting the vertical stack of elongate members on a first arm of a rotatable support member;
   rotating the rotatable support member from a first position to a second position wherein a second arm of the rotatable support member urges a bottom member from the stack of elongate members during the rotation and wherein the second arm urges the bottom member off of the first arm.

18. The method of claim 17, further comprising rotating the rotatable support member from the second position to the first position such that the stack of elongate members descends to be supported by the first arm of the rotatable support member in response to the rotatable support member rotating from the second position to the first position.

19. The method of claim 17, further comprising lowering the rotatable support member in a direction substantially parallel to the axis of rotation of the rotatable support member prior to rotating between the first position and the second position.

20. The method of claim 19, further comprising raising the rotatable support member in a direction substantially opposite to the direction of lowering the rotatable support member after rotating between the second position and the first position.

* * * * *